United States Patent
Spengler et al.

[11] 3,771,047
[45] Nov. 6, 1973

[54] APPARATUS FOR AUTOMATIC DETECTION OF THE COURSE OR BEHAVIOR OF THE IGNITION VOLTAGES WITH RESPECT TO TIME IN A MULTI-CYLINDER COMBUSTION ENGINE

[75] Inventors: Erich Spengler, Wolfsburg; Heiko Requardt, Gifhorn, both of Germany

[73] Assignee: Volkswagenwerk Aktiengesellschaft, Wolfsburg, Germany

[22] Filed: July 23, 1971

[21] Appl. No.: 165,079

[52] U.S. Cl. .............................................. 324/16 R
[51] Int. Cl. ................................................ G01m 15/00
[58] Field of Search ................. 324/15, 16 R, 16 T, 324/16 S; 73/116, 117.3, 118, 119

[56] References Cited
UNITED STATES PATENTS

| | | | |
|---|---|---|---|
| 3,603,872 | 9/1971 | Pelta | 324/16 R |
| 3,551,800 | 12/1970 | Widmer | 324/15 |
| 3,572,103 | 3/1971 | Marino | 324/16 |
| 3,630,076 | 12/1971 | Staudt | 324/15 |
| 3,650,149 | 3/1972 | Howes | 324/16 S |

*Primary Examiner*—Michael J. Lynch
*Attorney*—Ernest F. Marmorek

[57] ABSTRACT

In an apparatus for automatically detecting the response behavior of the ignition voltage with respect to time in the various elements of the high voltage devices in a multi-cylinder engine, wherein a first measuring signal generator delivers signals corresponding to the ignition voltages for all cylinders and has a plurality of parallel-lying storage measuring channels of a measuring unit connected therewith to which also a control unit is assigned which is coupled with a second measuring signal generator delivering signals corresponding at least timely to the ignition voltages for all cylinders, and wherein the individual measuring channels have timing stages included therein which clear or open the measuring channels only during a predetermined phase of interest during the time response curve of the ignition voltages, and which includes also a clear signal switching device of a selector which is coupled with a third measuring signal generator delivering signals corresponding at least in time to the ignition voltages for all cylinders and also with a fourth measuring signal generator delivering signals corresponding at least in time to the ignition voltages for one of the cylinders which is first in the ignition sequence, further comprising a shift register and gate switching devices which switch the clear signal generator only upon the arrival of signals from the fourth measuring signal generator during an ignition cycle of the engine, whereby an accurate pick-up of the ignition voltages results with respect to time in the form of a response curve at various phases of the ignition process, which curves can be further evaluated in output devices of the register or printing type.

11 Claims, 7 Drawing Figures

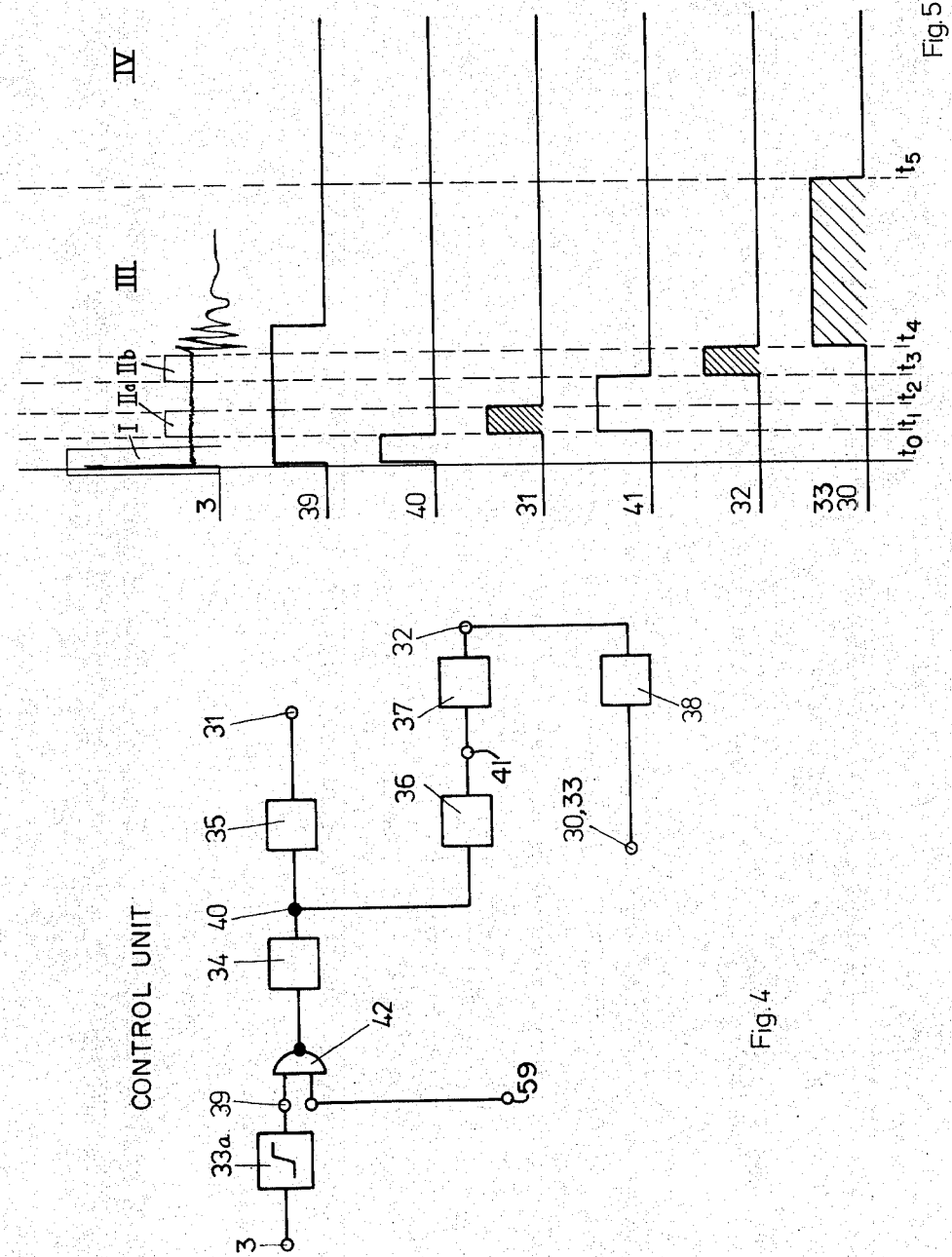

APPARATUS FOR AUTOMATIC DETECTION OF THE COURSE OR BEHAVIOR OF THE IGNITION VOLTAGES WITH RESPECT TO TIME IN A MULTI-CYLINDER COMBUSTION ENGINE

FIELD OF THE INVENTION

The present invention relates to an apparatus for the automatic pick-up or detection of the time behavior of the ignition voltages in a multi-cylinder combustion engine.

BACKGROUND OF THE INVENTION

During the inspection of motor vehicles the need might arise for a diagnostic device which is capable of detecting without much instrumentation and servicing the time behavior or course of the secondary voltages in the high voltage ignition devices assigned to the individual cylinders in a reliable fashion and to store or display them by means of an output registering or printing device.

The fact that one may draw from the time behavior of the ignition voltages conclusions as to the state of the ignition devices has been known and has been made use of with the help of the so-called ignition oscillographs. The basic difficulty of using such oscillographs resides in that a reliable servicing of the oscillographs is necessary, and in order to make a reproduceable image of the screen, a certain amount of education and experience is necessary. This led to the situation that the shops frequently avoid the use of the ignition oscillographs.

SUMMARY OF THE INVENTION

It is, therefore, an object of the present invention to provide an apparatus for the automatic pick-up or detection of the time behavior or course of the ignition voltages, which device eliminates the need for ignition oscillographs having the above-described difficulties.

It is another object of the present invention to provide an apparatus of the above-described type in which an automatic selection of the different ignition voltage curves and assignment thereof to the corresponding cylinders takes place, which otherwise would require additional steps giving rise to localized errors.

The apparatus according to the present invention is characterized in that a first measuring signal generator delivering signals corresponding to the ignition voltages for all cylinders has a plurality of parallel-lying storage measuring channels of a measuring unit connected therewith, to which also a control unit is assigned which is coupled with a second measuring signal generator delivering signals corresponding at least timely to the ignition voltages for all cylinders, and wherein the individual measuring channels have timing stages included therein which clear or open the measuring channels only during a predetermined phase of interest during the time response curve of the ignition voltages, and which comprise also a clear signal switching device of a selector which is coupled with a third measuring signal generator delivering signals corresponding at least in time to the ignition voltages for all cylinders and also with a fourth measuring signal generator delivering signals corresponding at least in time to the ignition voltages for one cylinder, further comprising a shift register and gate switching devices which switch the clear signal generator only upon the arrival of signals from the fourth measuring signal generator during an ignition cycle of the engine.

The apparatus according to the present invention makes a fully automated pick-up or detection of the time behavior or course of the ignition voltages in a multi-cylinder engine and which also assures the automatic assignment of the different curves to the corresponding cylinders. The operation of the apparatus according to the present invention requires no special knowledge or experience inasmuch as a printer or other type of registering device can be coupled to the apparatus to which again a further device can be coupled which can evaluate the different measuring result. The end result of the machine is in the form of a diagnostic report in which the different measuring data have been processed to a form of a diagnosis for the ignition device.

The invention starts with the principle that in most cases it is sufficient for analysis purposes to pick up samples at different time periods along the time axis of the ignition voltages. Considering the diagram shown in FIG. 1 in which the ignition voltage "u" of a certain cylinder is represented on the time axis "t", it is observed that a time behavior or course of the ignition voltages "u" can be practically subdivided into four phases.

The time curve or course starts in the instant of the opening of the contact breaker point of the ignition voltage generator with the ignition spike designated as Phase I, which is generated by the collapse of the magnetic field in the ignition coil. This ignition spark leads to the arching of the spark plug electrodes by the ignition spark. After termination of the very short Phase I the ignition voltage sinks to the magnitude of the combustion or arc-drop voltage which, due to the ionization of the gases located in the region of the spark-plug electrode and, occurring during Phase I, is considerably lower than the ignition spike. After termination of this eventual ignition Phase II the energy stored still in the ignition coil causes an oscillation during the transitional Phase III. Finally, the contact breaker point becomes closed again and the primary current generated again will induce in the turns of the ignition coil in Phase IV a voltage which may manifest itself in some damped oscillations.

As seen above, an accurate analysis of the above described relatively complicated time behavior of the voltages on the screen of an oscillograph requires an education and experience which is usually not available in practice. The present invention recognizes that the properties and the state of the different individual circuit elements of the ignition device affect in a different manner the resultant behavior curve. In the following chart those phases of the response curves illustrated in FIG. 1 are noted by a cross, the behavior or course of which is affected by the different circuit elements of the ignition device listed in this chart. The first two elements operate in common with respect to all cylinders of the machine, while the last two elements are associated with the individual cylinders.

| Element | I | II | III |
|---|---|---|---|
| Ignition coil | | | x |
| Ignition condenser | x | | x |
| Spark plug | x | x | |
| Secondary resistors | | x | |

From this chart and from the response curve one may, in most cases, arrive at a diagnosis when, for instance, within Phase II the amplitude of the voltage behavior according to the indicated crosses is twice observed and in Phase III one counts the zero nodes of the compensatory oscillations.

These principles and relations are used by the apparatus according to the present invention when the measuring channels assigned to each phase are cleared at a certain time instant for the receiving and possible evaluation of signals which are delivered by the different measuring signal generators in correspondence with the different ignition voltages. The clearing occurs or is performed by means of a control switch which comprises timing stages consisting of, for example, a sequence of monostable flip-flops or switching stages and, accordingly, the measuring channels associated with the different phases are cleared in a predetermined time sequence.

An essential part of the apparatus according to the present invention is, of course, a selector device which takes care that the measuring signals derived from the ignition voltages of the individual cylinders are registered in a predetermined sequence, preferably corresponding to the ignition sequence of the different cylinders. As a rule, the selector device is constructed in such a manner that the cylinder which is the first in the ignition sequence of the engine, starts also the measuring and registration process and then the measuring signals corresponding to the cylinder next following in the ignition cycle and corresponding to its ignition voltages, become evaluated.

In order to bring out a salient feature of the present invention, it should be stated that the first measuring signal device which delivers the actual measuring signals and must operate in its amplitude and time according to the ignition voltages assigned to all cylinders, may comprise a capacitive or inductive measuring signal generator which is arranged in the connecting line between the ignition coil and the distributor.

The further measuring signal devices serve only for the synchronous introduction of the processes occurring between the control unit and the selector device. The second and/or third measuring signal device can be formed by means of a tap on the ignition coil which is usually present and known in motor vehicles in the form of tap No. 1. The fourth measuring signal device is again a real measuring signal generator and is in the form of a capacitive or inductive measuring signal generator arranged on the individual ignition conductor of the cylinder which starts the entire measuring process and which is usually the first cylinder starting the ignition sequence.

In a preferred embodiment of the present invention the first phase of the ignition voltage behavior which might be of interest is usually the ignition spike having an associated measuring channel which is cleared for a reasonably long time and comprises a storage device which has associated with it an extinction circuit operated by the selector device after an ignition cycle is over. This storage device may comprise a storage capacitor which is placed into a charging circuit having a very small charging time constant while its discharge circuit is closed only after the termination of the ignition cycle. This circuit construction has its advantage in that whenever the ignition spike appears, its recording or pick-up can take place, while in order to pick up the remaining phases of interest a certain time shift will remain available.

In the event that a registering device, such as a printer, is coupled to the measuring unit, this registering device requires usually such a long registering time that within a given ignition cycle only the measuring signals obtained during the phase of interest of the time course of the ignition voltage of a single cylinder can be registered. In this case it might be advantageous that the control circuit of the shift register, which can be made as a ring counter, be provided in the selector device with a "clear" or clearing signal switch for the registering device and which is operated only after the completion of the registration of the last signal.

The shift register as to its details can be constructed in such a manner that the number of its stages is equal to the number of the cylinders of the engine and for the signals of the fourth measuring signal generator it has a counter therein and in its connection with the fourth measuring signal generator a clearing signal switch for the registering device is placed which controls always the next stage of the shift register as soon as it receives a signal from the fourth measuring signal generator. This counter effects a shifting of the shift register only when a clear or clearing signal is received from the registering device, as well as when a signal appears in the ignition cable assigned to the cylinder which is first in the ignition sequence.

BRIEF DESCRIPTION OF THE DRAWINGS

The invention will be more readily apparent from the following description of a preferred embodiment thereof shown, by way of example, in the accompanying drawings, in which:

FIG. 4 is a block diagram of the control unit according to this invention;

FIG. 5 is a time sequence diagram of the control signals fed to the measuring unit illustrated in FIG. 2;

DESCRIPTION OF THE PREFERRED EMBODIMENT

Figure 1:
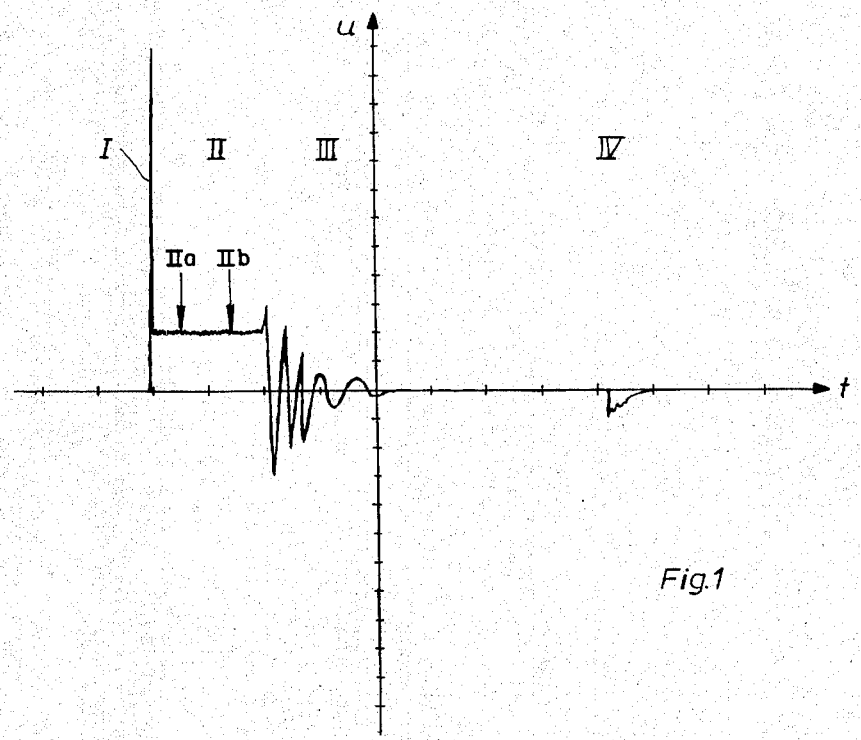
FIG. 1 is a graphical representation of the ignition voltages with respect to time in the assigned four phases.

FIG. 1 has already been described in the preceding Summary of the Invention.

Figure 3:
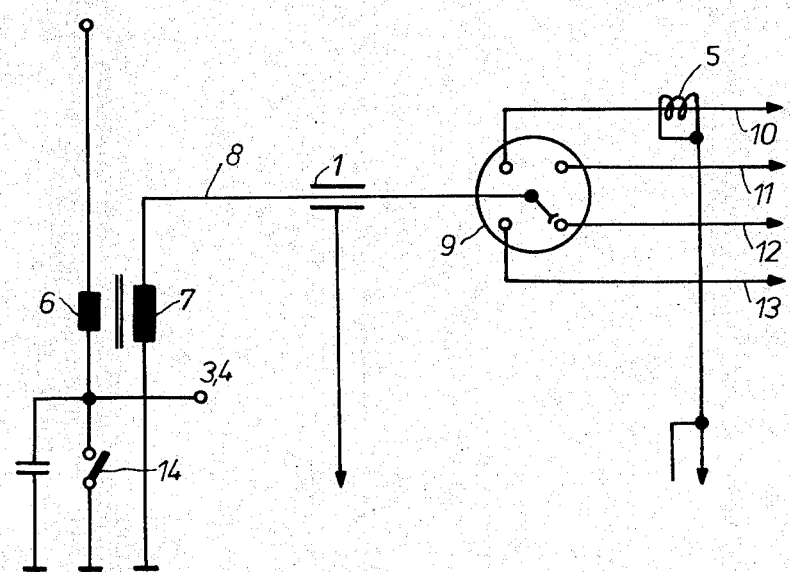
FIG. 3 is a circuit diagram of an ignition system of an engine including measuring signal pickups according to this invention.
Figure 2:
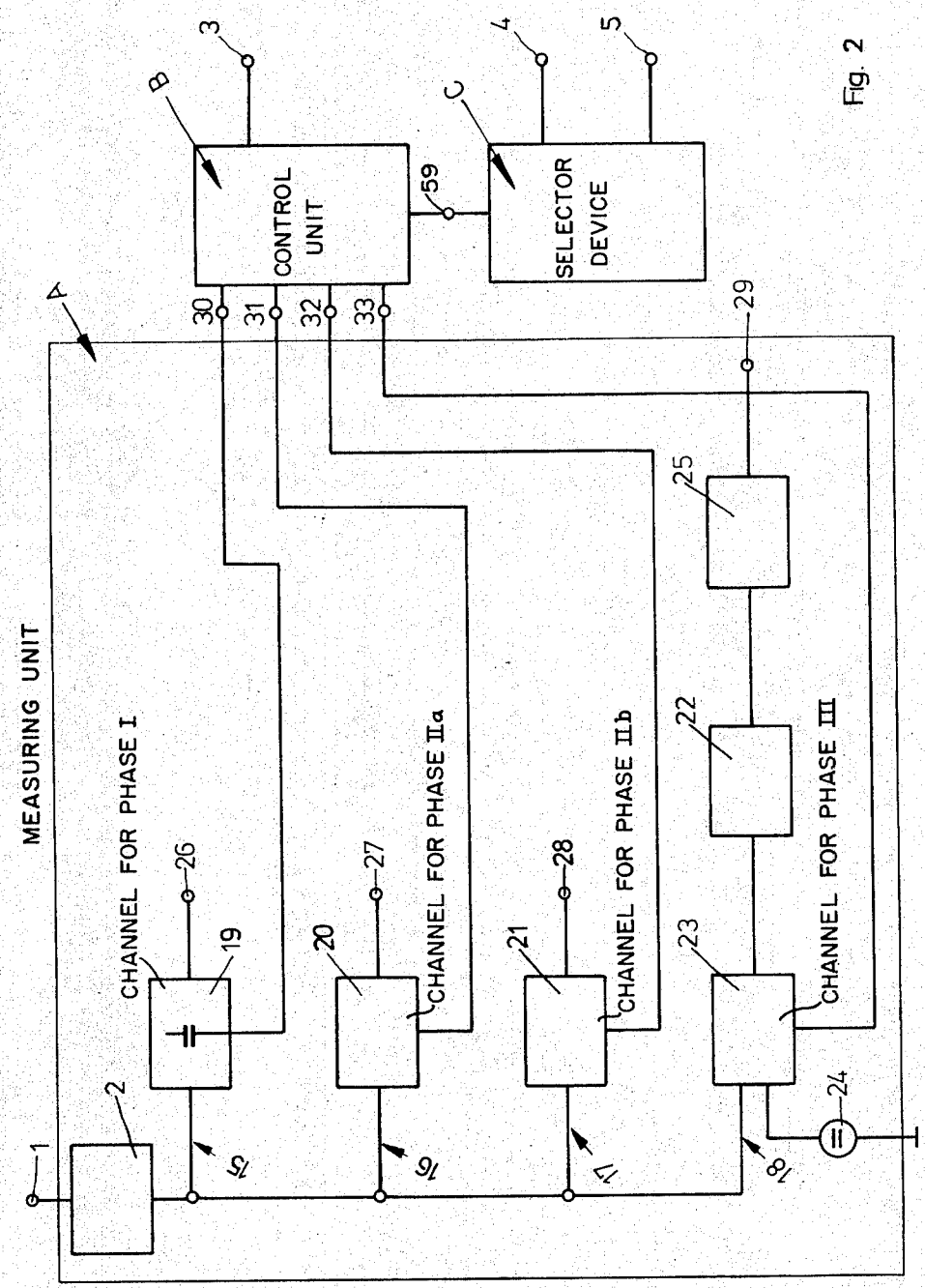
FIG. 2 is a block diagram of the entire apparatus according to the present invention.

Now with reference to FIG. 2, it is seen that the device according to the present invention can be subdivided essentially in three main parts, namely the measuring unit A, the control unit B connected thereto, and the selector C. The measuring signals are fed to the measuring unit A through a measuring signal pickup 1 which, in the illustrated embodiment, is represented as a capacitive measuring signal pickup capacitively coupled to the connecting conductor between the ignition coil on one hand and the distributor, on the other hand (FIG. 3). Accordingly, to the input of the measuring unit A formed by an impedance transformer 2, measuring signals are fed which, time- and amplitude-wise, are an image of the time behavior of the ignition voltages fed to all cylinders of the engine.

The control unit B, however, is coupled with the second measuring signal pickup 3 which, in the illustrated embodiment, is formed by the terminal or tap No. 1 of the motor vehicle, which is actually a tap on the primary winding of the ignition coil. The second measuring signal pickup 3 is identical with the third measuring signal pickup 4 which operates on the selector device C. The fourth measuring signal pickup 5 which also operates on the selector device C is, however, formed as an inductive measuring signal pickup which lies in the electromagnetic field of the ignition cable assigned to the cylinder which is first in the ignition sequence.

In the arrangement of the measuring signal device illustrated in FIG. 3, one can recognize the primary ignition coil 6, the secondary ignition coil 7, the ignition cable 8 to all cylinders which couples the coil 7 with the distributor 9, and the individual ignition cables 10 – 13 leading to the individual cylinders. The contact breaker point is designated by 14.

The measuring unit A illustrated in the embodiment of FIG. 2 comprises four measuring circuits or channels 15 – 18 of which the first is opened for a considerable time and comprises a spike storage device 19 for the storing of the ignition spike, while each of the two middle measuring channels 16 and 17 has an analog value storage device 20 and 21 which store a pair of timewise differing amplitudes IIa and IIb picked up during the arc-drop Phase II illustrated in FIG. 1. The fourth measuring channel 18 comprises, as its essential part, a counter 22 for the pick-up or detection of the number of the zero nodes in the oscillating Phase III. In order to prevent a weak oscillation which may occur in the region III of the curve from leading to an erroneous recording of the zero nodes, the counter 22 has a comparator 23 connected in front of it, which by employing a biasing source 24 forms an amplitude threshold device for the counter 22. As a result the counter 22 does not actually record the zero nodes of the voltage curve, but it measures the number of passages of the oscillating voltage through a line of a predetermined constant voltage. Behind the counter 22 in the measuring direction lies in the fourth measuring channel 18 a digital-analog-transducer 25 which, in the present illustrated embodiment, translates the number measured by the counter 22 into a corresponding analog value.

To the outputs 26 – 29 of the above described measuring unit A there is coupled a registering device, preferably a printer; it is, however, not shown in the drawings, as it can be one well known in the art.

As mentioned above, the individual measuring channels receive each only the measuring signals which correspond to a phase of interest of the time behavior of the ignition voltage. With respect to the first measuring channel 15, the above mentioned feature is accomplished in that a capacitor storage device 19 having a very small charging time constant is used therein, the discharge circuit of the capacitor becomes closed only by a control circuit B described hereinafter. As a result, the storage device 19 practically during the entire measuring time will store the amplitude of the ignition spike which then can be taken off subsequently at the terminal 26. Such discharging of the storage capacitor in the storage device 19 occurs by means of the control unit B having for this purpose a terminal 30 with which the storage capacitor of the device 19, as shown in FIG. 2, is coupled. This output 30 is shown also in FIG. 4 which illustrates the control unit B in detail.

The measuring channels 16, 17 and 18 are also connected with the output terminals 31, 32, 30 of the control unit B, respectively.

As can be seen from FIG. 4 in conjunction with the diagram illustrated in FIG. 5, the control unit B is connected to the second measuring signal pickup 3 through a pulse shaper 33, and comprises a string or series of monostable switching stages 34 – 38 which operate in a predetermined time sequence. In the diagram of FIG. 5 the voltages appearing at different points within the circuit of FIG. 4 are plotted against the time $t_0$ to $t_6$. The first, that is the top line of the diagram of FIG. 5, represents once more the time response or behavior of an ignition voltage wherein in the form of narrow rectangles the different phases of interest I, II and III are shown as represented from the view point of measuring technique. The corresponding control voltages which are fed to the measuring unit A, shown in FIG. 2, appear also at points 31, 32 and 30 of the control unit shown in FIG. 4.

Figure 6:
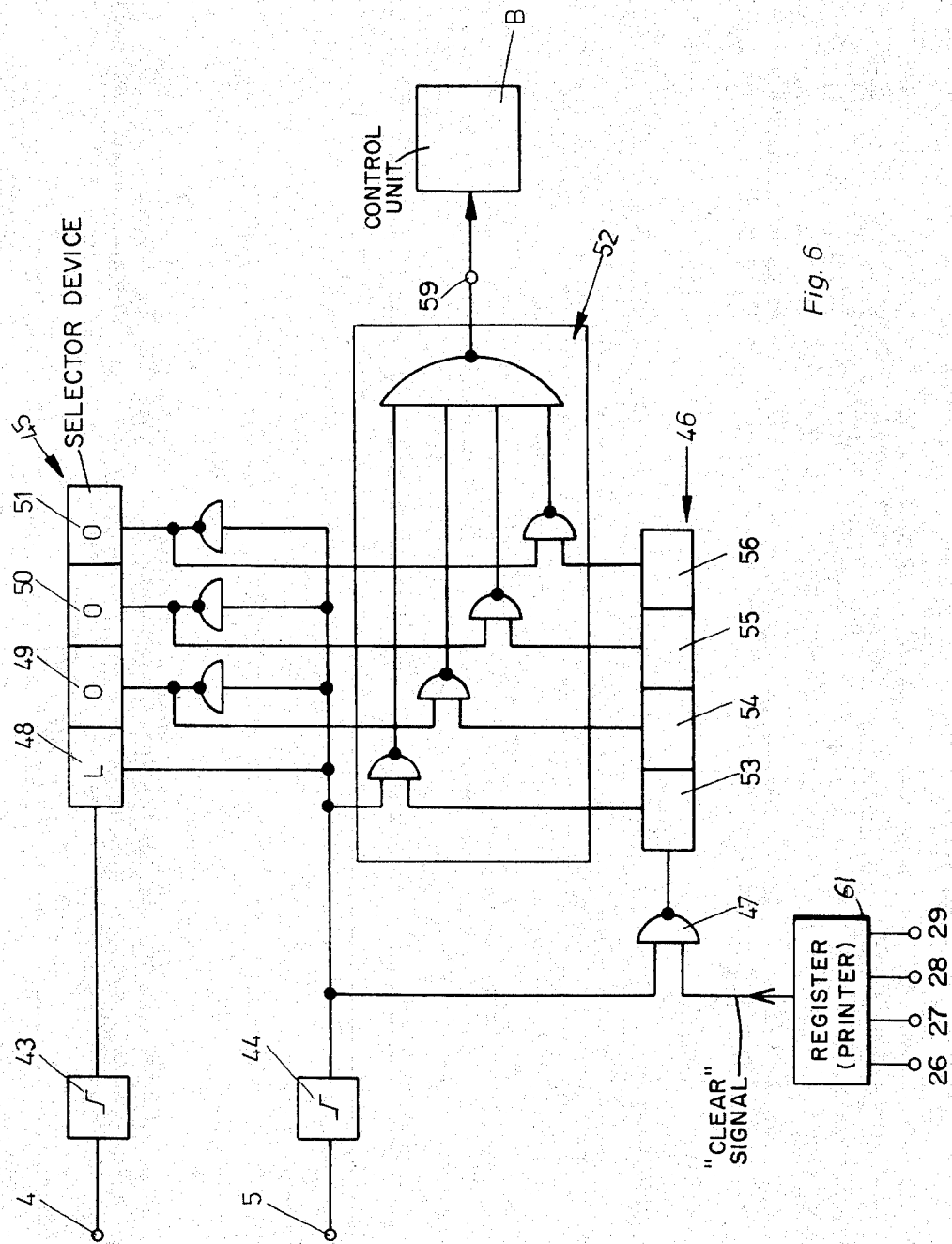
FIG. 6 is a block diagram of the selector device.

While this control unit B is concerned with the assignment of the individual measuring channels to the different phases of interest of the response curve of the ignition voltage fed to an individual cylinder, the selector device C illustrated in FIG. 6 performs in a time sequence the selective assignment or selection of the above described devices A and B to the ignition voltages fed to the different cylinders. The selector device performs the above described operation by means of the clear signals switch 42 placed in the measuring unit, illustrated in FIG. 4, with which the connection to the measuring signal device 4 can be interrupted.

To the selector device C shown in FIG. 6, the measuring signals produced by the measuring signal pickups 4 and 5 are fed, as already mentioned in connection with FIG. 2. Accordingly, the pulse shaper 43 receives signals which correspond at least in time to all the ignition signals, while the pulse shaper 44 receives only such signals which correspond at least in time to the ignition voltages fed to the first cylinder.

The selector C illustrated in FIG. 6 comprises a shift register 45 and a counter 46 placed in its control circuit. The counter 46 counts the pulses delivered by the fourth measuring signal pickup 5.

In the control circuit of the counter 46 lies, in turn, a gate device 47 over which a clear or clearing signal is fed from the output registering device, which may be a printer, to the counter 46. Only when such clear signal is simultaneously present with a measuring signal from the measuring signal pickup 5, the counter 46 is operated and thereby the shift register 45 is shifted by one step. The shift register 45 in the illustrated embodiment has four stages, namely 48–51. The gating switch 52 is constructed in such a manner that each measuring signal coming from the measuring signal pickup 5 and eventually from the first cylinder, will set the individual stages of the shift register 45 into the states shown in FIG. 6. Upon arrival of signals which originate from the ignition voltages for the cylinders 4, 3 and 2 appearing in such a sequence in the ignition cycle, the shifting of the state "L" or "on" occurs each time into the next stage of the shift register 45. The selector device accompanies this with a series-like forward switching of the measuring unit A (FIG. 2) to the measuring signals originating from the different cylinders.

Figure 7:
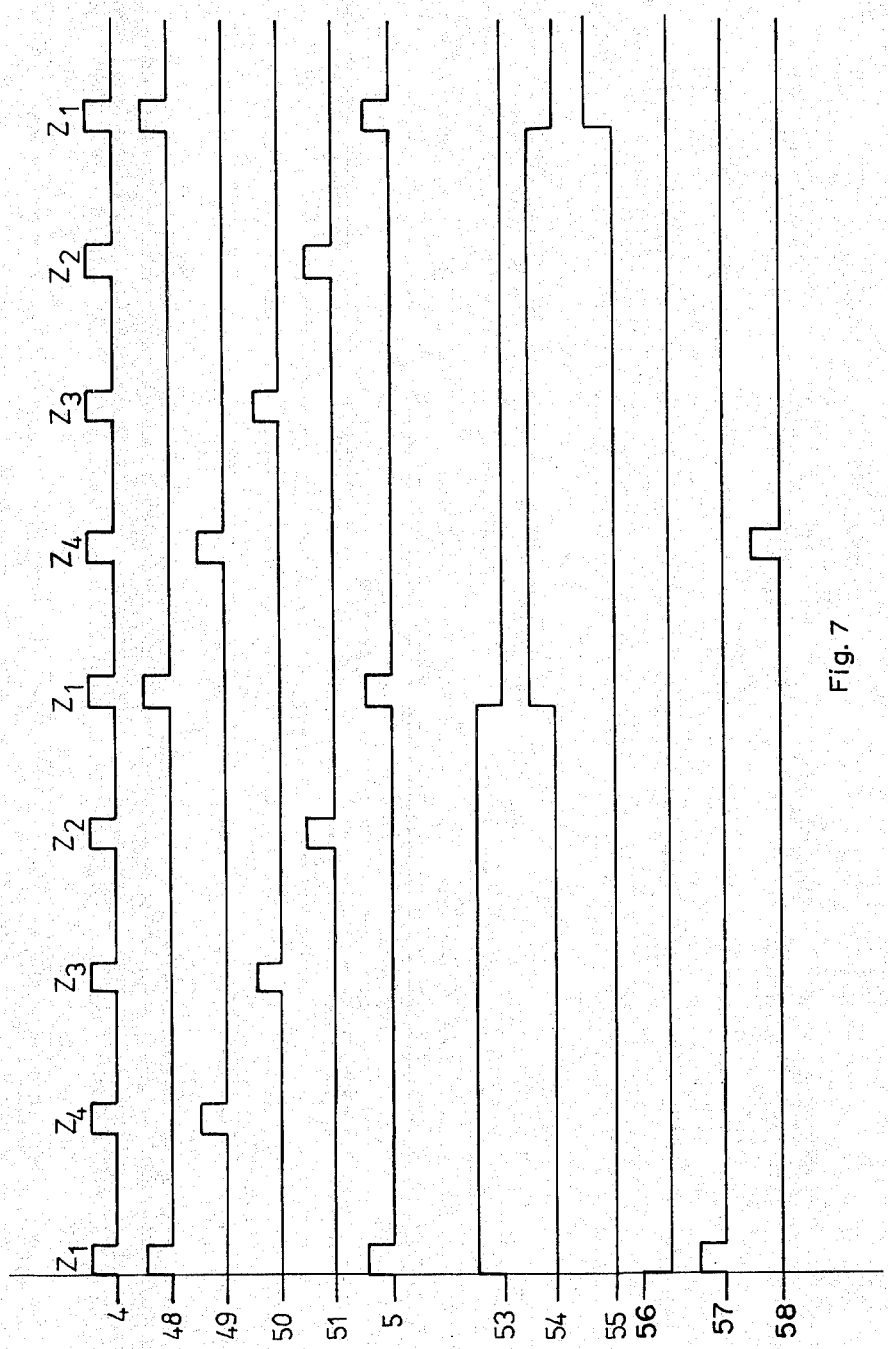
FIG. 7 illustrates the operation of the selector of FIG. 6 by showing comparatively the signal behavior in its different parts.

The operation of the selector C becomes more apparent from the time diagram illustrated in FIG. 7, wherein each line the different voltages are plotted against the time. In the illustrated embodiment according to the present invention of the apparatus, it has been assumed that the diagnosis of a four-cylinder engine is undertaken. Accordingly, there are four groups of measuring signals and other voltages in each ignition cycle, namely, each cylinder Z1 – Z4 has its own group. It is also assumed that the measurements are performed in a boxer engine having an ignition sequence of Z1-Z-4-Z3-Z2. Accordingly, the shift register 45 comprises also, as mentioned above, four stages 48 – 51 and the counter 46 has also four stages 53 – 56.

Considering the diagram of FIG. 7, the first line represents the measuring signals delivered by the measuring signal pickup 4 (terminal 1 of the vehicle). The following four lines illustrate the position signals which are fed to the stages 48–51 of the shift register 45. It is understood that the representation shows feeding of the individual stages with an "L" signal.

In the sixth line of the diagram of FIG. 7 there are represented the signals fed by the measuring signal pickup 5 to the pulse shaper 44. The next four lines represent, respectively, the state of an individual stage of the group 53–56 of the counter 46. As already shown by the first two illustrated ignition cycles, also here a switching step from one stage to the next occurs, during which, however, one stage of the counter 46 which during the first ignition cycle corresponds to the stage 53, becomes excited for a longer time.

The gate switch 52 is constructed in such a manner that the clear signal switch 42 in the control unit (FIG.4) is switched only when the selector device C shown in FIG. 6 satisfies a certain coincidence condition. More particularly, a pick-up or detection of the ignition voltage fed to the cylinder Z1 occurs only when in the second line of the diagram of FIG. 7, as well as in the seventh line thereof, a signal is present. As a result a signal 57 (see FIG. 7) is generated which then operates the clear signal switch 42. The same holds also for the pick-up or detection of the time response or behavior of the ignition voltage fed to cylinder Z4. More particularly, in this case a signal must be present in the third line and also in the eighth line of the diagram in FIG. 7, in order that a clear signal 58 could be delivered to the switch 42, and accurately at a time instant when the ignition voltage is there.

The operation of the entire apparatus is as follows:

Referring now to the measuring unit A as shown in FIG. 2 and to the control unit B as explained in greater detail in FIGS. 4 and 5, the analysis of an ignition voltage is carried out as follows: the ignition signal detected by the pickup 1 is fed through an impedance matching circuit 2 into measuring channels 15–18. Channel 15 includes a peak or spike value storage circuit 19 for storing the maximum amplitude of the incoming signal; each of channels 16 and 17 includes an analog value storage circuit 20 and 21 for storing a lower amplitude following the peak amplitude, and channel 18 includes counter 22 associated at its input with a counting level adjusting circuit 23 and 24, and having at its ouput a digital-analog convertor 25. The counting level adjusting circuit comprises a comparator 23 and a bias voltage source 24 as it will be explained later. The channels 15–18 are terminated with terminals 26–29, which are connected to the input of a suitable registering or printing device. The printing device starts printing the stored data in respective storage circuits 19–23 in response to a print commond signal and upon the termination of the printing process releases a control signal for starting the measuring cycle on another cylinder. As it has been explained above, the analysis of an ignition voltage is based on the measurement of amplitudes during predetermined time intervals or phases I to III of the time response curve of the ignition voltage. For this purpose, a signal detected by the pickup 3 (FIGS. 4 and 5) is fed to the input of the control unit B. This signal is shaped in the shaper 33a and enteres one input 39 of the switching gate 42 in the form of a pulse 39' as shown on the second line of the diagram in FIG. 5. Signal 57 (second line from the bottom in FIG. 7) is applied to the other input 59 of the switching gate 42, the gate 42 opens and the signal 39 activates the timing circuits 34 to 38. The timing circuits are designed so as to produce actuating pulses 31, 32 and 30 or 33 as marked by hatched lines in the diagram in FIG. 5. The actuating signal 31 controls the opening and closing of the analog value storage circuit 20 during the time interval $t_1$ to $t_2$; the actuating signal 32 controls the opening and closing of the analog value storage circuit 21 during the interval $t_3$ to $t_4$. It will be seen from the first line of the diagram in FIG. 5, that the two actuating signals 31 and 32 determine the preselected phases of interest IIa and IIb in the section II shown in FIG. 1. As regards the peak value storage circuit 19, it is designed for storing the maximum amplitude of the ignition signal. The storage circuit 19 is therefore opened for the period from $t_0$ to $t_4$ during the phases I and II and is disconnected from the pickup 1 by the signal 30 at the beginning of the phase III at the time $t_4$. On accomplishing the measuring process the printer receives print command (at the end of the pulse 30, at the time $t_5$) and as soon as the printing operation is completed, it transmits in a conventional manner an acknowledgement or "clear" signal which is fed to one input of the gate 47 in the selector C (FIG. 6) which in turn delivers a singal 58 into the input 59 of the switching gate 42 and the measurement of the ignition voltage of the subsequent cylinder is ready to start.

From the above it is apparent that although the invention has been described hereinbefore with respect to a certain embodiment thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desire to be secured by Letters Patent, is as follows:

1. An apparatus for the automatic analysis of the time response of the ignition voltages in a multi-cylinder engine,
   comprising, in combination:
   first pickup means operable for delivering measuring signals corresponding to the ignition voltages of all cylinders of said multi-cylinder engine;
   a measuring unit including a plurality of parallel signal storing and measuring circuits each having a first input connected to said first pickup means, a second input and an output;

second pickup means operable for delivering signals corresponding in time to the ignition voltages of all cylinders, a control unit coupled to said second pickup means and including a plurality of timing stages each coupled to an assigned second input of respective storing and measuring circuits and being operable for activating said circuits in a predetermined time sequence corresponding to predetermined discrete phases of interest of the time response of the ignition voltage of a cylinder; and registration means connected to the outputs of respective storing and measuring circuits to register values as measured during said phases of interest of the ignition voltages of respective cylinders, wherein a storing and measuring circuit assigned to a last phase of interest of said ignition response includes means for counting oscillations of said ignition voltage.

2. The apparatus as claimed in claim 1, further comprising a third pickup means operable for delivering signals corresponding in time to the ignition voltage of a predetermined one cylinder, and a selector unit including a gate device responsive to said third pickup means and to said registration means, a gated switching means controlled by said gate device and being coupled to said control unit for determining time intervals for the ignition voltages of the cylinders subsequent to said one cylinder.

3. The apparatus as claimed in claim 2, wherein said gated switching means comprises a shift register having as many stages as many cylinders are in the engine is coupled to the output of said gate device.

4. The apparatus as claimed in claim 1, wherein said one cylinder is the cylinder which is first in the ignition sequence of the engine.

5. The apparatus as claimed in claim 1, wherein said first pickup means is placed between an ignition coil and a distributor device of said engine, said first pickup means comprising a capacitive or inductive measuring signal device.

6. The apparatus as claimed in claim 1, wherein said second pickup means is formed as a tap means on said ignition coil.

7. The apparatus as claimed in claim 2, wherein said third measuring device is a capacitive or inductive measuring device placed in the individual ignition conductor of a cylinder.

8. The apparatus as claimed in claim 1, wherein one of said storing and measuring circuits assigned to the first phase of interest of said response curve of said ignition voltages remains clear for a longer time and comprises a storage device having discharging circuit operated by said measuring unit after termination of an ignition cycle.

9. The apparatus as claimed in claim 2, wherein said registering means includes a printer coupled to said measuring unit and activating said clearing signal switch upon the registration of a last signal.

10. The apparatus as claimed in claim 1, wherein said means for counting and registering comprises a counter for changes of the polarity occuring in the signal after the termination of the ignition spike.

11. The apparatus as claimed in claim 10, wherein said counter comprises a threshold device for an amplitude of the signals coming from the first pickup means.

* * * * *